United States Patent
Shin et al.

(10) Patent No.: US 8,180,400 B2
(45) Date of Patent: May 15, 2012

(54) SERVICE SETTING FOR MOBILE COMMUNICATION TERMINAL

(75) Inventors: Jae Yong Shin, Incheon (KR); Sung Yong Kang, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 1109 days.

(21) Appl. No.: 11/828,906

(22) Filed: Jul. 26, 2007

(65) Prior Publication Data

US 2008/0064443 A1    Mar. 13, 2008

(30) Foreign Application Priority Data

Sep. 8, 2006 (KR) .................. 10-2006-0086624

(51) Int. Cl.
*H04M 1/00* (2006.01)
(52) U.S. Cl. ..................... 455/558; 455/435.2
(58) Field of Classification Search .................. 455/403, 455/415, 417, 452.1, 452.2, 435.2, 552.1, 455/558, 435.1
See application file for complete search history.

(56) References Cited

U.S. PATENT DOCUMENTS

| | | | | |
|---|---|---|---|---|
| 5,764,730 A | * | 6/1998 | Rabe et al. | 455/403 |
| 5,987,325 A | * | 11/1999 | Tayloe | 455/435.2 |
| 2004/0180657 A1 | * | 9/2004 | Yaqub et al. | 455/435.1 |
| 2008/0020773 A1 | * | 1/2008 | Black et al. | 455/445 |

FOREIGN PATENT DOCUMENTS

| | | |
|---|---|---|
| CN | 1678119 A | 10/2005 |
| KR | 10-2004-0003222 A | 1/2004 |

* cited by examiner

*Primary Examiner* — Dwayne Bost
*Assistant Examiner* — Myron Wyche
(74) *Attorney, Agent, or Firm* — Birch, Stewart, Kolasch & Birch, LLP

(57) ABSTRACT

A method for setting a service in a mobile communication terminal including at least first and second user identity cards. The method includes selecting the first identity card to be used for mobile communication, and requesting services directed to the second identity card be forwarded to the first identity card.

10 Claims, 5 Drawing Sheets

SERVICE SETTING FOR MOBILE COMMUNICATION TERMINAL

This nonprovisional application claims priority under 35 U.S.C. §119(a) to Patent Application No. 10-2006-0086624 filed in Korea on Sep. 8, 2006, the entire contents of which are hereby incorporated by reference.

BACKGROUND OF THE INVENTION

1. Field of the Invention

The present invention relates to a mobile communication terminal including multiple identity cards.

2. Discussion of the Related Art

A mobile communication service provider or a mobile carrier generally authenticates the use of a service based on subscriber identification information transmitted from each mobile communication terminal and charges the user for using the service. The mobile communication service provider also stores information needed to use the service, such as a telephone number of a subscriber, a subscriber authentication key, an encryption module, and service network information in a card medium, and mounts the card medium in the mobile communication terminal to thereby provide a communication service to the mobile terminal.

In more detail, the card medium is referred to as subscriber identity module (SIM) card in the Global System for Mobile Communications (GSM) system, a Universal Subscriber Identity Module (USIM) card in the Universal Mobile Telecommunication System (UMTS), and a User Identity Module (UIM) card or Removal User Identity Module (RUIM) card in the Code Division Multiple Access (CDMA) system. Further, when a mobile terminal having a SIM card is turned on, the terminal first transmits user identification information stored in the SIM card to a service provider through a service network and receives an authentication for using service from the service provider.

In addition, some terminals include multiple SIM cards. In this instance, the user manually activates one of the cards corresponding to a desired service. For example, when a terminal has two slots with two SIM cards mounted therein (i.e., SIM cards A and B), the user selects one of the A and B SIM cards, and uses a service corresponding to a telephone number of the selected SIM card.

That is, when the user selects the A SIM card, the mobile terminal is recognized by the telephone number of the A SIM card and thus receives calls and messages directed at the telephone number of the A SIM card. Further, in this instance, the B SIM card remains inactivated and a service corresponding to the telephone number of the B SIM card is not available. A similar concept applies to when the user selects the B SIM card. Thus, the user is unable to receive calls or messages on a deactivated SIM card.

SUMMARY OF THE INVENTION

Accordingly, one object of the present invention is to address the above-noted and other problems.

Another object of the present invention is to provide a mobile communication terminal and corresponding method in which a user may receive calls or messages sent to a telephone number corresponding to a deactivated SIM card at a telephone number corresponding to an activated SIM card.

To achieve these and other advantages and in accordance with the purpose of the present invention, as embodied and broadly described herein, the present invention provides in one aspect a method for setting a service in a mobile communication terminal including at least first and second user identity cards. The method includes selecting the first identity card to be used for mobile communication, and requesting services directed to the second identity card be forwarded to the first identity card.

In another aspect, the present invention provides a mobile communication terminal, which includes at least first and second user identity cards, an RF module configured to receive signals from at least first and second service networks corresponding to the first and second user identity cards, respectively, and a controller configured to select the first identity card to be used for mobile communication, and to request services directed to the second identity card be forwarded to the first identity card.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF PREFERRED EMBODIMENTS

Hereinafter, exemplary implementations of service setting for a mobile communication terminal will be described in more detail with reference to the drawings.

Figure 1:
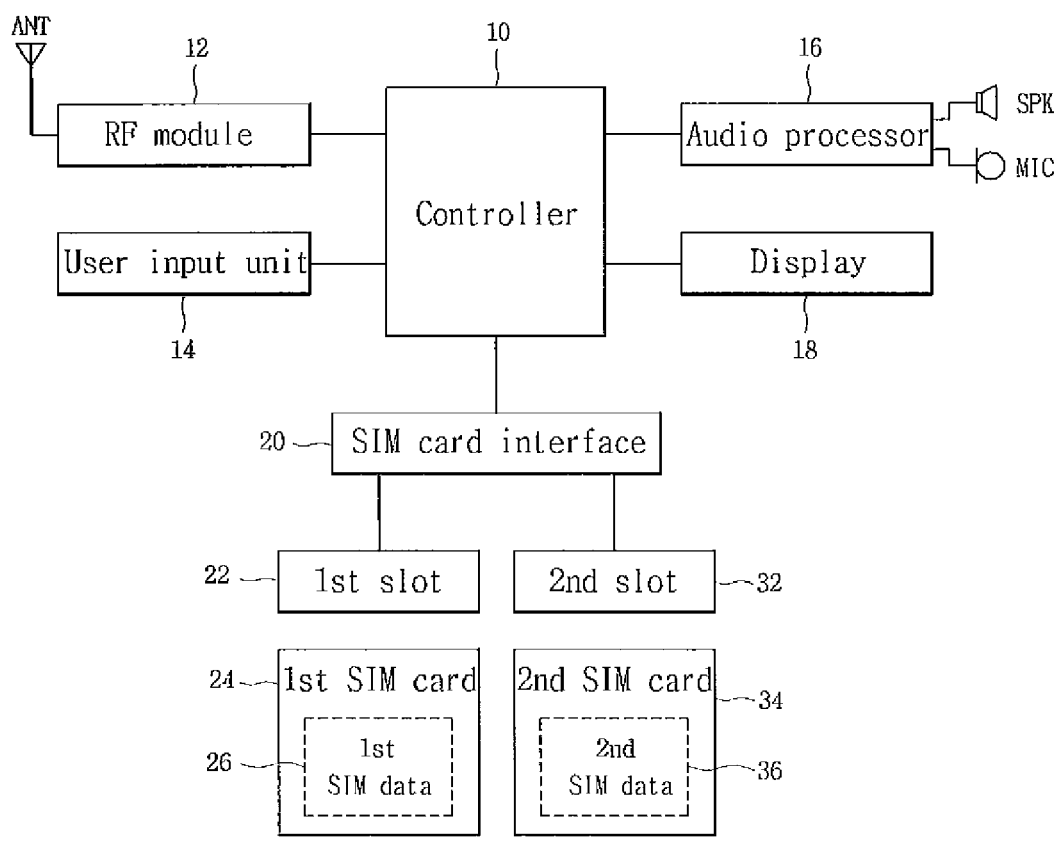
FIG. 1 is a block diagram illustrating a mobile communication terminal having multiple Subscriber Identity Module (SIM) cards according to an embodiment of the present invention.

Turning first to FIG. 1, which is a block diagram illustrating a mobile communication terminal having multiple SIM cards. In particular, FIG. 1 illustrates the mobile terminal having first and second SIM cards 24 and 34 respectively mounted in first and second slots 22 and 32.

Further, the SIM cards 24 and 34 are generally issued and managed by a mobile communication service provider independently from a mobile communication terminal. In addition, the SIM cards 24 and 34 store SIM data 26 and 36 such as an International Mobile Station Identity (IMSI) for identifying a mobile station, an encryption key, positioning information, and telephone numbers. Further, the IMSI is unique information given to each subscriber, and includes a mobile country code (MCC), a mobile network code (MNC), and a mobile station identifier number (MSIN).

The SIM card 24 or 34 can also be referred to as a Universal Subscriber Identity Module (USIM) card in the Universal Mobile Telecommunication System (UMTS), and a User Identify Module (UIM) card or a Removal User Identity Module (RUIM) in the Code Division Multiple Access (CDMA).

In addition, as shown in FIG. 1, the mobile terminal also includes a radio frequency (RF) module 12, an audio processor 16, an input unit 14, a display 18 and a controller 10. The RF module 12 transmits/receives radio signals, and the audio processor 16 processes audio signals input and output through a speaker (SPK) and microphone (MIC). Further, the input unit 14 receives data from a user, and the display 18 displays a variety of menus and other information to a user of the terminal. The controller 10 controls the above elements and performs call communication services and other additional functions.

The mobile communication terminal also includes a SIM card interface 20 for inputting and outputting data to and from the SIM cards 24 and 34 mounted in the first and second slots 22 and 32. The controller 10 also loads the SIM data from the SIM cards 24 and 34 through the SIM card interface 20. Alternatively, the controller 10 can store user input data as SIM data 26 and 36.

Further, the RF module 12 transmits and receives radio signals through a service network providing a mobile communication service. That is, the RF module 12 can request service subscription registration or request to use an additional service selected by the user by transmitting data to a service system or another mobile communication terminal. The RF module 12 can also transmit audio and video data to another mobile communication terminal, receive radio signals transmitted through the service network, and receive a call request or data such as a short message service (SMS) from another terminal.

In addition, the input unit 14 includes a plurality of number keys and function keys and outputs signals corresponding to any selected keys to the controller 10. The audio processor 16 processes the digital signals received through the RF module 12, outputs the resultant signals as an audio frequency signal through the speaker (SPK), converts analog speech signals input through the microphone (MIC) into digital signals, and transmits the digital signal to the controller 10.

Also, the display 18 displays data input by the user and a data processing result obtained based on the data input by the user under control of the controller 10. For example, when the user selects a SIM card selection menu, the display 18 displays a screen allowing the user to select any one of the SIM cards 24 and 34, and then displays a result obtained by processing the data input by the user in the menu.

Further, the SIM card interface 20 detects whether the SIM cards 24 and 34 are mounted in the first and second slots 22 and 32 when the system is turned on, loads the SIM data 26 and 36, and transmits the SIM data 26 and 36 to the controller 10. Also, the SIM card interface 20 activates the SIM card 24 or 34 in accordance with instructions from the controller 10. The controller 10 then controls the overall operations of the terminal based on the activated SIM card.

In more detail, when the SIM cards 24 and 34 are mounted in the slots 22 and 32, the controller 10 activates the SIM card 24 and 34 based on a predetermined method (described in detail later), and requests for a service network registration based on the SIM data stored in the activated SIM card, and requests the service of the inactivated SIM card be forwarded to the activated SIM card.

Further, the SIM data 26 and 36 includes an International Mobile Station Identify (IMSI), an encryption key, positioning information and telephone number. Specifically, the IMSI includes a Mobile Network Code (MNC) indicating a Mobile Country Code (MCC) and a service network, and a Mobile Station Identifier Number (MSIN) indicating a telephone number. Thus, the controller 10 registers a telephone number corresponding to the MSIN in a service network corresponding to the MNC included in the SIM data of the activated SIM card between the two SIM cards 24 and 34 to use the service, and requests a call forwarding service to forward receiving messages and calls at the telephone number of the inactivated SIM card to the telephone number of the activated SIM card.

In addition, the user may directly select and activate any one of the SIM cards 24 and 34 via a SIM card selection menu. Also, the controller 10 can receive signals through service networks in the RF module 12, determine a service network with a superior network condition, and automatically activate a SIM card corresponding to the service network with the superior network condition.

Thus, according to the present invention, when the mobile terminal includes multiple SIM cards mounted thereon, phone calls, messages, etc. provided to the telephone number of the inactivated SIM card can be forwarded to the telephone number of the activated SIM card.

Figure 2:
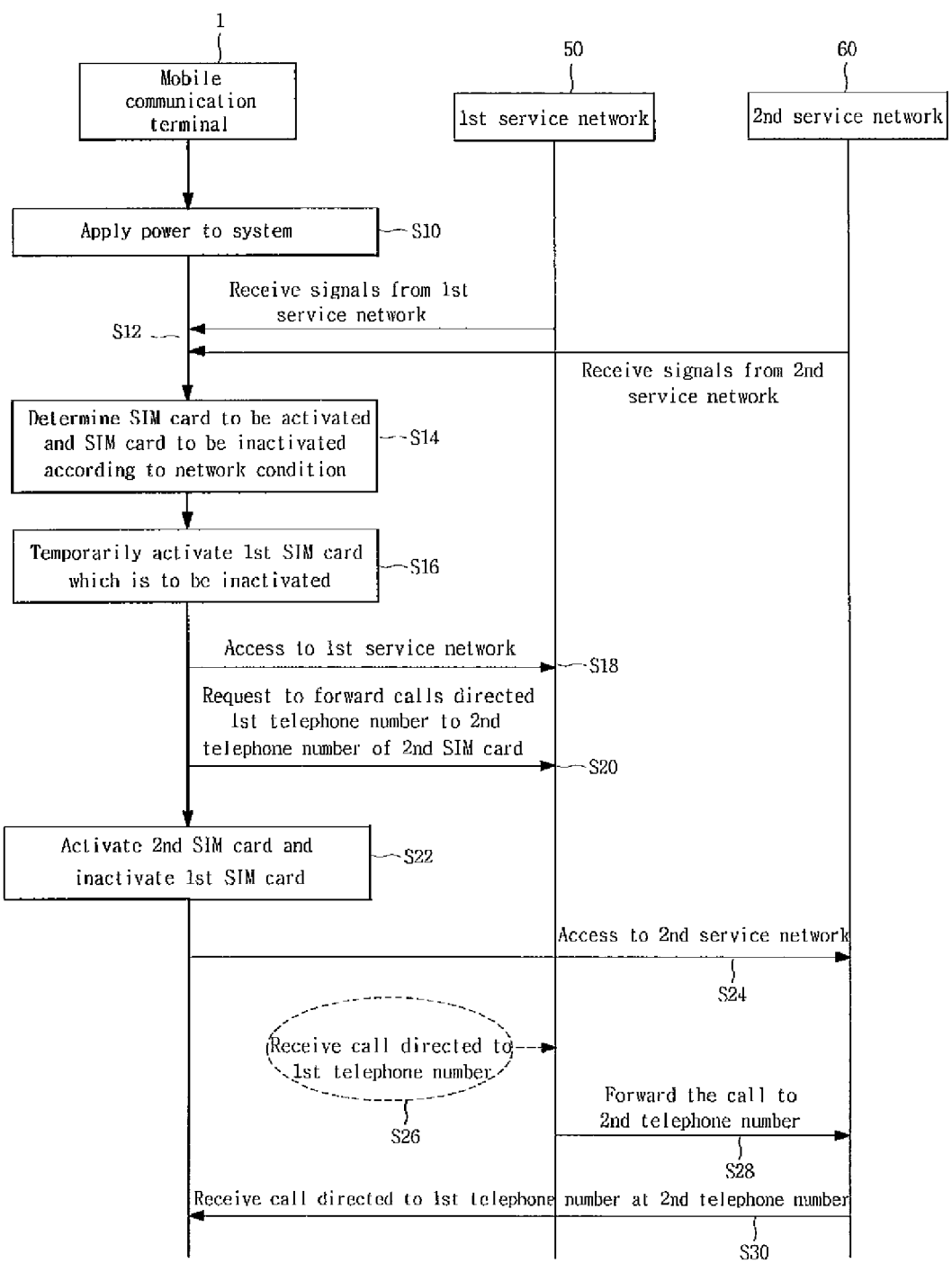
FIG. 2 is a signal flow diagram illustrating signals communicated in a mobile communication system according to an embodiment of the present invention.

In more detail, FIG. 2 is a signal flow diagram illustrating signals communicated in a mobile communication system according to an embodiment of the present invention. In particular, FIG. 2 illustrates how a service network is determined when a mobile communication terminal is turned on and power is applied to the system and how a call is controlled. Further, the mobile communication terminal 1 including the two SIM cards 24 and 34 shown in FIG. 1 is referred to in this description.

As shown in FIG. 2, the communication includes a first service network 50 that is a communication network for providing a service to a first SIM card 24, and a second service network 60 that is a communication network for providing a service to a second SIM card 34. The mobile terminal 1 communicating with the first and second networks 50 and 60 is also illustrated.

As shown in FIG. 2, when the mobile terminal 1 is first turned on (step S10), the mobile terminal 1 receives signals of available service networks (i.e., signals from the first service and second networks 50 and 60 in this example) (step S12). Next, the terminal 1 checks the service conditions for both networks 50 and 60, and selects one of the networks that has the best service network conditions based on an intensity of the received network signals, etc. The terminal 1 then selects which of the SIM cards will be used as the activated SIM card and which one will be the deactivated card based on the determined network conditions (step S14).

In addition, in this example, the second service network is assumed to have a superior service network condition and the second SIM card 34 is determined to be the activated SIM card, and the first SIM card 24 is determined to be the inactivated SIM card. Therefore, the mobile terminal 1 temporarily activates the first SIM card 34 (step S16), to thereby request a call forwarding service for the first telephone number corresponding to the first SIM card 24 that will be later deactivated.

In more detail, the mobile communication terminal 1 accesses the first service network 50 using the temporarily activated first SIM card 24 (step S18), and requests that calls received at the first telephone number used in the first service network 50 be forwarded to the second telephone number corresponding to the second SIM card 34 (step S20). That is, the mobile terminal 1 requests a call forwarding service, which is an additional service provided by the mobile communication system that forwards calls, messages and/or other services directed to the first telephone number to the second telephone number.

Then, upon successfully establishing the call forward service for the first SIM card 24, the mobile terminal 1 activates the second SIM card 34 and inactivates the first SIM card 24 (step S22). Next, the mobile terminal 1 is disconnected from the first service network 50, and connected to the second service network 60 based on the second SIM data 36 of the activated second SIM card 34 to thereby receive a corresponding mobile communication service (step S24).

That is, the mobile terminal 1 is registered at the second telephone number and receives calls and/or messages directed to the second telephone number. Accordingly, when the terminal 1 makes a call or transmits data or a message to another mobile communication terminal, the terminal 1 uses the second telephone number as its identification number.

Meanwhile, when a call is made to the first telephone number or a message and/or data is transmitted to the first telephone number of the first SIM card 24 (step S26), the first service network 50 forwards the call, message and/or data to the second telephone number based on the call forwarding service (step S28).

Then, the second service network 60 provides the calls originally directed to the first telephone number to the mobile terminal 1 registered at the second telephone number (step S30). Thus, the terminal 1 also receives the call, the message and/or data directed to the first telephone number of the first SIM card 24 in addition to the call, message and/or data directed to the second telephone number of the second SIM card 34.

Figure 3:
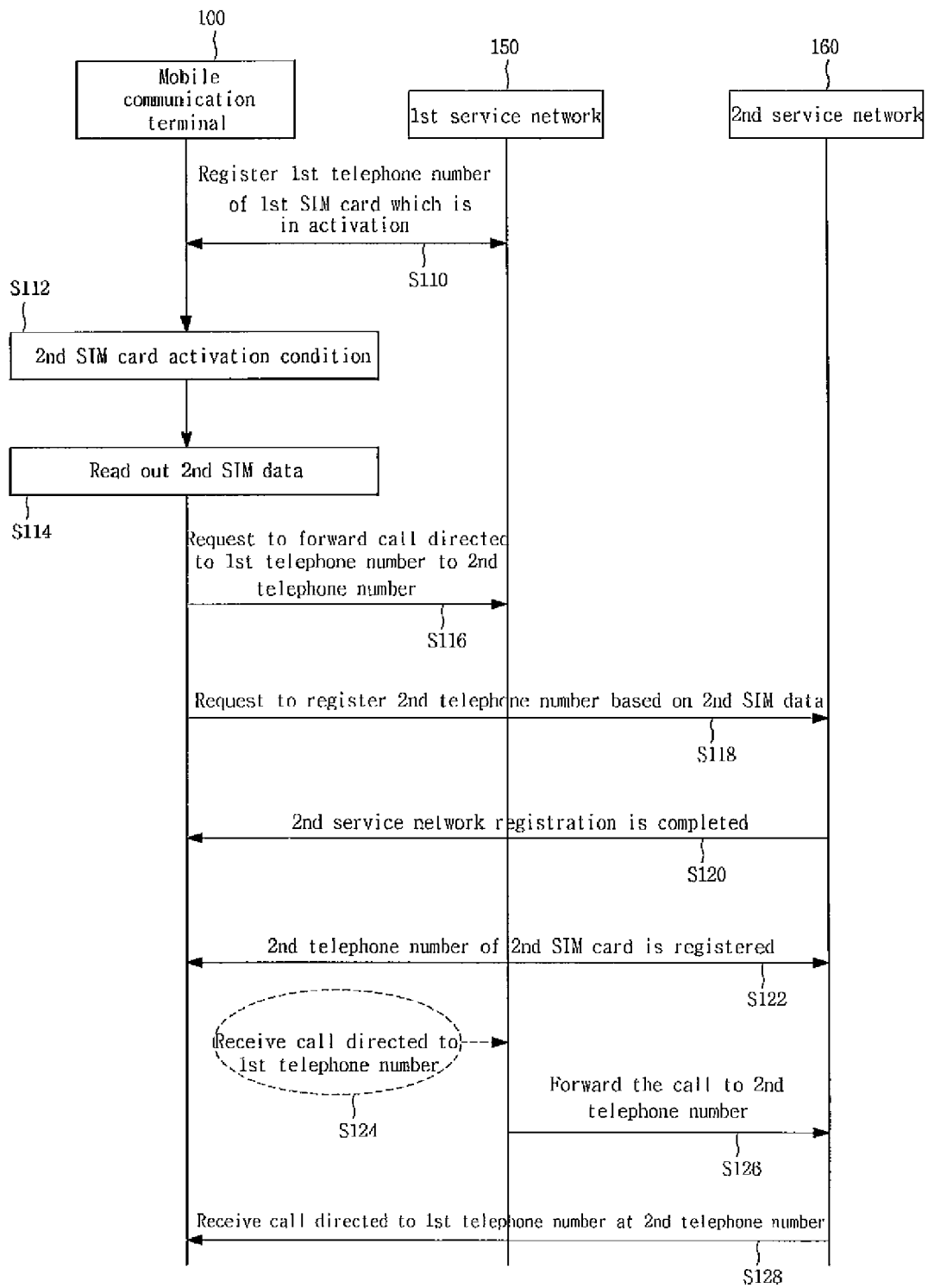
FIG. 3 is another signal flow diagram illustrating signals communicated in a mobile communication system according to an embodiment of the present invention.

Turning next to FIG. 3, which is another signal flow diagram illustrating signals communicated in a mobile communication system according to an embodiment of the present invention. That is, FIG. 3 illustrates an embodiment when a service network corresponding to a particular network is already established and then changed during the already established service. In more detail, the first service network 150 is a communication network for providing a service based on the first SIM card 24, and the second service network 60 is a communication network for providing a service based on a first SIM card 34.

Thus, as shown in FIG. 3, the mobile communication terminal 100 including the two SIM cards 24 and 34 activates the first SIM card 24 to thereby use the service based on the first SIM data 26 (step S110). Further, during the use of the service, the mobile terminal 100 enters a second SIM card activation condition (step S112). In addition, the reasons for changing into the service corresponding to the second SIM card 34 are diverse. For example, a user may select the use of the second SIM card on a SIM card selection menu, or the terminal 100 may determine that the second service network 160 has a superior service network condition compared to the first service network 150.

Therefore, when the mobile terminal 100 enters the activation condition of the second SIM card 34, the terminal 100 reads the second telephone number to be registered to the second service network 160 based on the second SIM data 36 of the second SIM card 34 (step S114). Then, the mobile terminal 100 requests the first service network 150 forward calls directed to the first telephone number used in the first service network 150 to the second telephone number of the second SIM card 34 (step S116). In other words, the terminal 100 makes a request for the call forwarding service to forward calls, messages and other services directed to the first telephone number to the second telephone number.

After the call forwarding service request is made to the first service network 150, the mobile terminal 100 activates the second SIM card 34 and requests registration to the second service network 160 at the second telephone number of the second SIM card 34 (step S118). When the second service network 160 allows the service registration request from the terminal 100 (step S120), the second service network 160 at the second telephone number is registered in the terminal 100 (step S122).

Thus, the terminal 100 can receive calls, data and/or messages directed to the second telephone number. Further, when the mobile terminal 100 calls or transmits data and/or a message to another mobile terminal, the terminal 100 uses the second telephone number as its identification number. The first SIM car 24 is also deactivated.

In addition, when another calling party transmits a call, a message, a service and/or data to the first telephone number of the first SIM card 24 (step S124), the first service network 150 forwards the call, message service and/or data to the second telephone number based on the requested call forwarding service (S126).

The second service network 160 then provides the calls directed to the first telephone number to the mobile terminal 100 registered at the second telephone number (step S128). Thus, the mobile terminal 100 can receive calls, data, and/or messages directed to the first telephone number of the first SIM card 24, which is inactivated.

Figure 4:
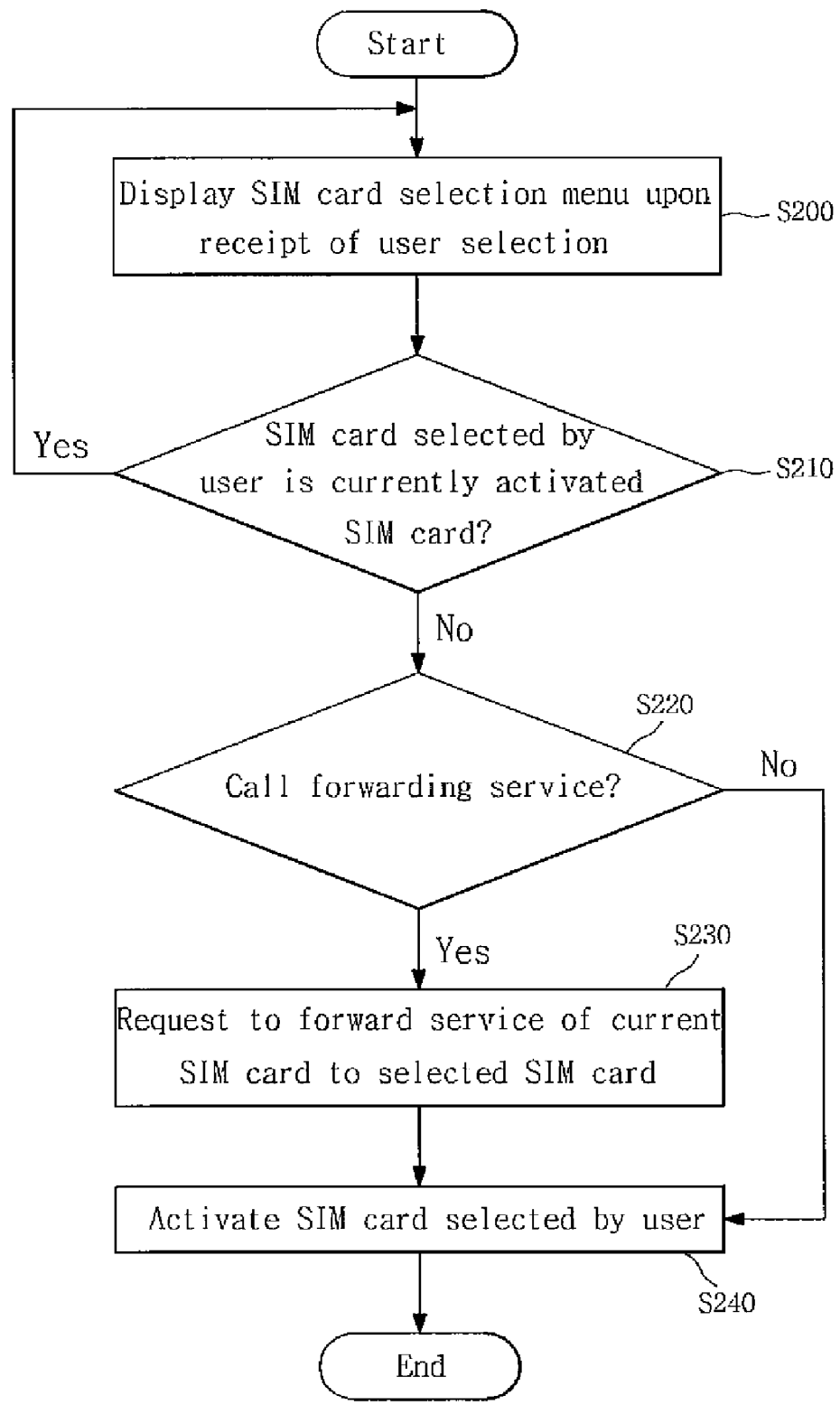
FIG. 4 is a flowchart illustrating a method for setting a service in a mobile communication terminal according to an embodiment of the present invention.

Next, FIG. 4 is a flowchart illustrating a method for setting a service in a mobile communication terminal according to an embodiment of the present invention. As shown, the method first displays a SIM card selection menu based on a user's instruction (step S200). That is, the controller 10 displays a list of available SIM cards currently mounted in the mobile terminal 100.

Figure 5:
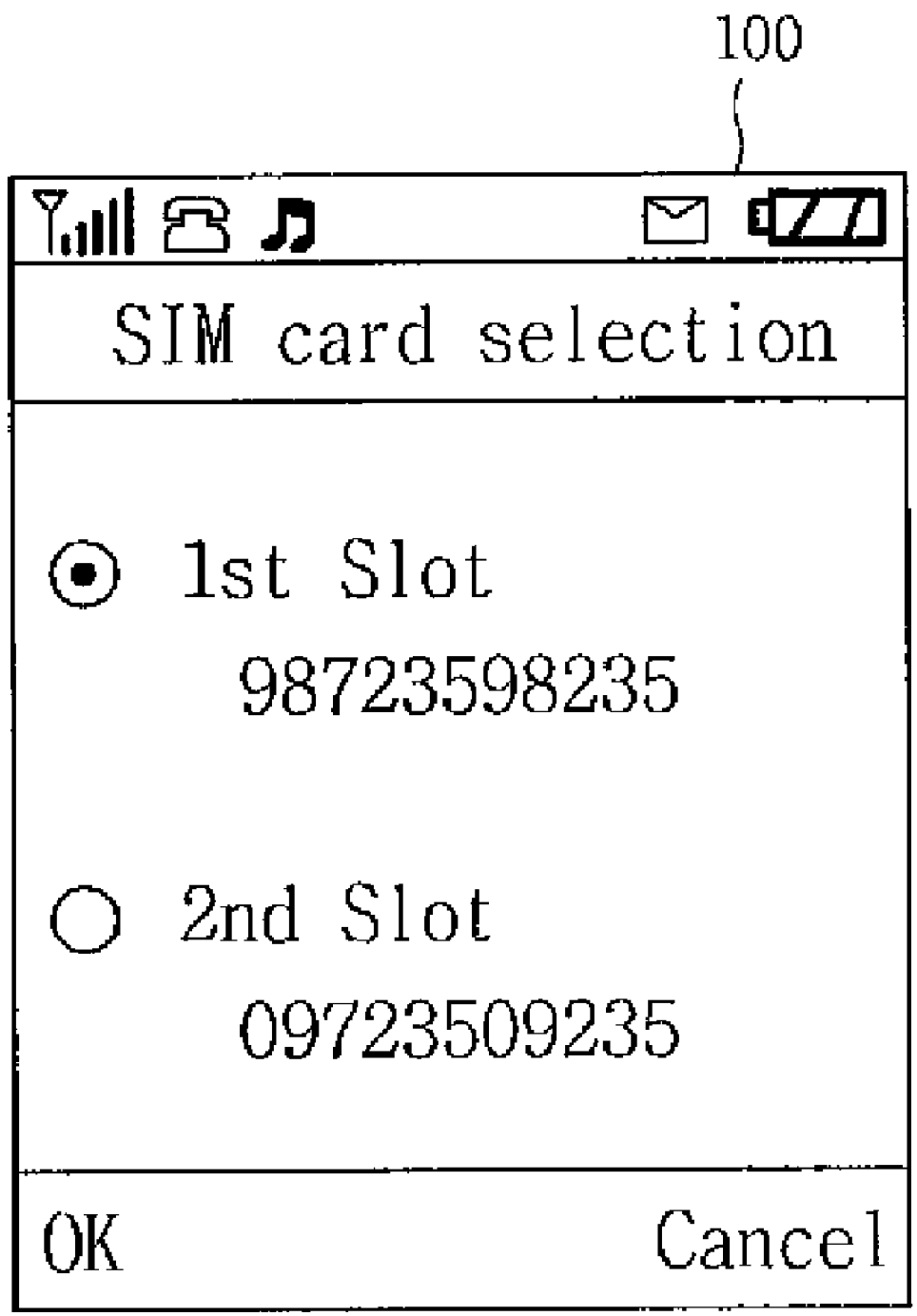
FIG. 5 is an overview illustrating a SIM card selection menu in a mobile communication terminal according to an embodiment of the present invention.

For example, FIG. 5 is an overview illustrating an example of a SIM card selection menu 200. As shown in FIG. 5, the SIM card selection menu 200 includes identification information of the SIM cards mounted in the first slot 22 and the second slot 32 of the terminal 100. Thus, the user can select one of the SIM cards in the first and second slots 22 and 32 by manipulating direction keys of the input unit 14, for example.

As shown in FIG. 4, when the user selects one of the SIM cards displayed in the SIM card selection menu 200, the controller 10 determines whether or not the selected SIM card is currently activated (step S210). When the selected SIM card is already activated (Yes in S210), the current service is maintained.

However, when the selected SIM card is not currently activated (No in step S210), the controller 10 determines whether or not the service network of the currently activated SIM card provides a call forwarding service for forwarding calls, messages, and/or data (step S220).

For example, the user can be prompted with a menu asking them if they want calls forwarded. Alternatively, the mobile terminal can check with the first and second networks to determine if a call forwarding service is available for the particular terminal. When the service network of the currently activated SIM card provides the call forwarding service (Yes in step S220), the mobile terminal 100 requests the current service network forward the service provided to the currently activated SIM card to the telephone number corresponding to the SIM card that the user has selected (step S230).

For instance, when the current service network provides the call forwarding service, the terminal 100 requests the current service network forward calls directed to the telephone number of the currently activated SIM card to the telephone number corresponding to the SIM card that the user has selected. After the call forwarding service request is made, the terminal 100 activates the SIM card that the user has selected and accesses to the service network corresponding to the selected SIM card and deactivates the previously activated SIM card (step S240).

In addition, when the service network of the currently activated SIM card does not provide the call forwarding service or the user does not want the forwarding service (No in step S220), the controller 10 activates the SIM card selected by the user and deactivates the previously activated SIM card. Further, when the user selects a currently inactivated SIM card in the SIM card selection menu 200, the method can also provide the user with a forwarding menu (not shown) to determine whether or not the user wants to forward the current service to a newly selected SIM card.

In addition, the above-described embodiments refer to the mobile terminal 100 including two SIM cards. However, the present invention also can be applied to mobile terminals including three or more SIM cards.

Accordingly, as described above, the present invention advantageously allows calls, messages, data, etc. to be forwarded from a deactivated SIM card to an activated SIM card mounted in the mobile terminal. Therefore, the user is able to continuously receive calls, messages, data, etc. to all telephone numbers corresponding to SIM cards included in their mobile terminal, even though some of the SIM cards are deactivated.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method for setting a service in a mobile communication terminal including at least first and second user identity cards, the method comprising:
   receiving signals from first and second networks corresponding to the first user identity card and the second user identity card, respectively, before the first and second identity cards are activated on the mobile terminal;
   comparing signal strengths of the signals from the first and second networks;
   determining the signal from the first network is stronger than the signal from the second network;
   selecting the first user identity card to be used for mobile communication based on the determining step determining the signal from the first network is stronger than the signal from the second network;
   temporarily activating the second user identity card;
   accessing the second network corresponding to the second user identity card and requesting the second network forward services directed to the second user identity card to the first user identity card; and
   activating the first identity card and deactivating the second user identity card before accessing the first network and after requesting the second network forward services directed to the second user identity card to the first user identity card.

2. The method of claim 1, wherein the determining step is performed automatically by the terminal without user intervention.

3. The method of claim 1, wherein the determining step comprises:
   displaying a result of the comparing step to a user; and
   selecting, by the user, the signal from the first network.

4. The method of claim 1, wherein the first and second user identity cards include one of a subscriber identity module (SIM) card in the Global System for Mobile Communications (GSM) system, a Universal Subscriber Identity Module (USIM) card in the Universal Mobile Telecommunication System (UMTS), and a User Identity Module (UIM) card or Removal User Identity Module (RUIM) card in the Code Division Multiple Access (CDMA) system.

5. The method of claim 1, further comprising:
   selecting the second user identity card to be used for mobile communication; and
   requesting services directed to the first user identity card be forwarded to the second user identity card.

6. A mobile communication terminal, comprising:
   at least first and second user identity cards;
   an RF module configured to receive signals from at least first and second service networks corresponding to the first and second user identity cards, respectively, before the first and second identity cards are activated on the mobile terminal; and
   a controller configured to compare a signal strength of the signals from the first and second networks, to determine the signal from the first network is stronger than the signal from the second network, to select the first user identity card to be used for mobile communication based on the determining step determining the signal from the first network is stronger than the signal from the second network, to temporarily activate the second user identity card, to access the second network corresponding to the second user identity card and request the second network forward services directed to the second user identity card to the first user identity card, and to activate the first identity card and deactivate the second user identity card before accessing the first network and after requesting the second network forward services directed to the second user identity card to the first user identity card.

7. The mobile communication terminal of claim 6, wherein the controller selects the first user identity card automatically without user intervention.

8. The mobile communication terminal of claim 6, further comprising:
   a display unit configured to display information to a user of the terminal,
   wherein the controller displays a result of the comparison on the display unit, and receives a signal from the user requesting the signal from the first network be used for communication.

9. The mobile communication terminal of claim 6, wherein the first and second user identity cards include one of a subscriber identity module (SIM) card in the Global System for Mobile Communications (GSM) system, a Universal Subscriber Identity Module (USIM) card in the Universal Mobile Telecommunication System (UMTS), and a User Identity Module (UIM) card or Removal User Identity Module (RUIM) card in the Code Division Multiple Access (CDMA) system.

10. The mobile communication terminal of claim 6, wherein the controller selects the second user identity card to be used for mobile communication, and requests services directed to the first user identity card be forwarded to the second card.

* * * * *